United States Patent [19]

Hong-Rong et al.

[11] Patent Number: 5,462,019
[45] Date of Patent: Oct. 31, 1995

[54] ANIMAL LEASH

[76] Inventors: Shiau Hong-Rong, 29595 Colony Cir., Farmington Hills, Mich. 48334; Ching S. Chen, No.220, Ta Pu Rd., Changha City, Taiwan

[21] Appl. No.: 309,428

[22] Filed: Sep. 20, 1994

[51] Int. Cl.$^6$ .................................................. A01K 27/00
[52] U.S. Cl. .................................................. 119/795
[58] Field of Search .................................. 119/795, 797, 119/798, 793, 786, 787, 769

[56] References Cited

U.S. PATENT DOCUMENTS

| | | | |
|---|---|---|---|
| 153,724 | 8/1874 | Schmidt | 119/795 X |
| 548,062 | 10/1895 | Joyner | 119/787 |
| 2,827,017 | 3/1958 | Ryan | 119/109 |
| 3,798,934 | 3/1974 | Wright et al. | 119/795 |
| 4,019,463 | 4/1977 | Kitchen | 119/793 |
| 4,398,500 | 8/1983 | Koronkiewicz | 119/109 |
| 4,763,609 | 8/1988 | Kulik | 119/109 |
| 5,174,246 | 12/1992 | Driver | 119/795 |

FOREIGN PATENT DOCUMENTS

| | | | |
|---|---|---|---|
| 188814 | 7/1937 | Switzerland | 119/795 |
| 634446 | 3/1950 | United Kingdom | 119/795 |

*Primary Examiner*—Gene Mancene
*Assistant Examiner*—Thomas Price
*Attorney, Agent, or Firm*—Charles W. Chandler

[57] ABSTRACT

An animal leash includes a length of aircraft cable and a clamp that can be adjusted along the cable. The clamp has an eye for receiving a snap connector on the end of the cable so that the leash can be formed with a loop with a fixed diameter. The leash permits the animal to move around a tree without the leash wrapping around the tree trunk.

1 Claim, 1 Drawing Sheet

ANIMAL LEASH

BACKGROUND OF THE INVENTION

This invention is related to a pet leash having an end that can be connected to a slidable clamp on the leash to form a loop of an adjusted diameter.

Animal leashes are usually made so that the pet owner can walk his pet, such as his dog. One end of the leash is connected to the pet's collar, the other end is held by the user. Frequently, the pet owner desires to temporarily connect the leash to a post or tree, so that the dog can be restrained unattended. Usually, the leash is connected around the post in a loop that tends to tighten as the dog moves around the tree. Ultimately, the loop tightens such that the pet then wraps the balance of the leash around the tree. Such prior art leashes may be found in U.S. Pat. No. 153,724, which was issued on Aug. 4, 1874, to R. Schmidt for "Halters"; and U.S. Pat. No. 2,827,017, which was issued on Mar. 18, 1958 to Thomas W. Ryan for "Leashes for Animals". Another solution is to provide hardware forming a fixed loop at one end of the leash such as is illustrated in U.S. Pat. No. 4,763,609, which was issued Aug. 16, 1988, to Bruce Kulik, and U.S. Pat. No. 4,398,500, which was issued Aug. 16, 1983, to Henry L. Koronkiewicz for "Locking Animal Collar".

SUMMARY OF THE INVENTION

The broad purpose of the present invention is to provide an improved animal leash in which a conventional snap type connector is mounted on the end of the leash. A complementary clamping connector is slideably mounted along the leash. The clamp connector has an eye for engaging the snap connector to form the leash into a loop of the desired diameter. A thumb screw on the clamp connector permits the user to readily fix the connector at a desired position along the leash. Preferably, the leash is formed with a sufficiently large loop so that the animal can readily move around the tree or post without the leash clinging to the tree and winding up as the animal progresses around the tree.

Still further objects and advantages of the invention will become readily apparent to those skilled in the art to which the invention pertains upon reference to the following detailed description of the drawings.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
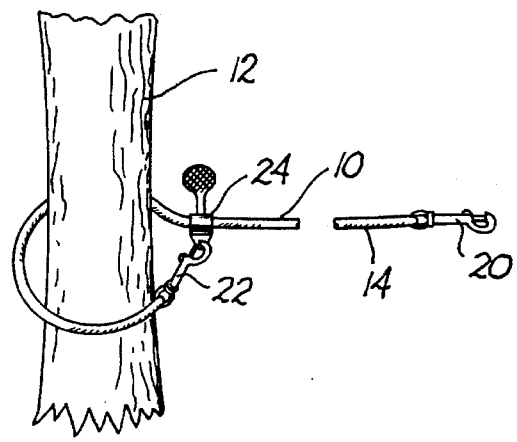
FIG. 1 illustrates a leash embodiment of the invention connected around the trunk of a tree.

Referring to the drawings, FIG. 1 illustrates a leash 10 connected around the trunk of a tree 12. Leash 10 preferably comprises what is commonly known as an aircraft cable 14 which comprises a metal cable wrapped in a somewhat transparent plastic coating. For illustrative purposes, cable 14 has a length of about 15 feet.

Figure 2:
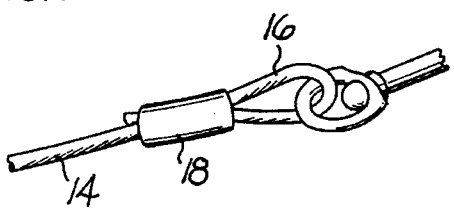
FIG. 2 illustrates the manner in which each end of the leash is connected to a snap connector.

Referring to FIG. 2, each end of the cable is doubled on itself to form a loop 16. A metal clamp 18 is wrapped around the loop to permanently retain the cable in it's looped condition. A pair of conventional snap type connectors 20 and 22 are connected to the loops at the cable ends. Connector 20 is useful for being connected to the conventional metal ring, not shown, on a dog collar. The snap connector at the other end of the cable may be connected to a clamp type connector 24.

Connector 22 has a hook 26 which defines an opening 28. A spring biased latch 30 may be pulled by a handle 32 toward the cable to open opening 28, or released so that the latch closes opening 28.

Figure 4:
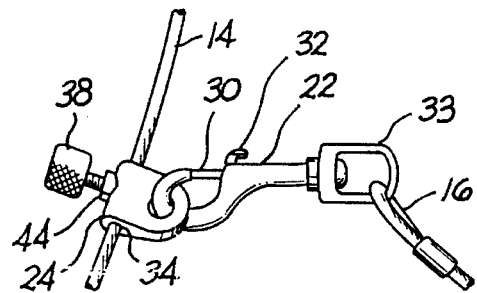
FIG. 4 illustrates the clamping connector connected to the snap connector.

Referring to FIG. 4, a ring-shaped element 33 is rotatably mounted on the body for receiving loop 16 of the cable.

Figure 3:
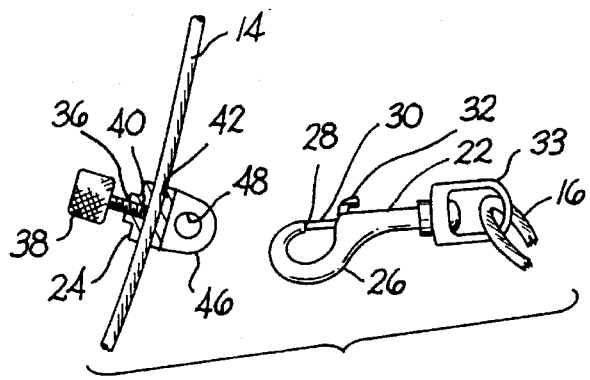
FIG. 3 illustrates the clamping connector separated from the snap connector.

Clamp connector 24 is formed with a metal body having a bore 34 that extends through the body with a diameter slightly larger than the diameter of cable 14. The cable is inserted through bore 34. The body has a threaded opening 36 disposed at right angles to bore 34. A thumb screw 38 is threadably mounted in opening 36 so that end 40 of the thumb screw can clamp the cable between the end of the thumb screw and the internal side wall 42 of the bore, as illustrated in FIG. 3. Preferably the body has a boss 44 to stabilize the thumb screw.

The body also has an intergral tab 46 that forms an eyelet 48. Hook 26 can be inserted in eye 48. When latch 30 is released, the two connectors are then joined together in a loose fitting connection.

In use, the user will normally have connector 24 mounted on the cable at a desirable position for walking the pet. When the leash is to be connected to a tree trunk, the user clamps connector 24 at a desirable position along the cable to form a large loop around the tree trunk. He snaps connector 22 onto eye 48. He can reverse the process simply by pulling on latch 30 to disconnect the two connectors.

The preferred embodiment of the invention provides a relatively simple and convenient means for temporarily restraining a pet while permitting the pet to readily run around the tree without wrapping the leash around the trunk. Connector 22 is a conventional commercial device as is cable 14. Thus the preferred leash can be easily manufactured.

Having described our invention, we claim:

1. A dog leash comprising:

an elongated flexible cable (14) having a generally uniform cross section along its length;

said cable having first and second ends; each of said ends of the cable comprising a loop (16);

a snap-type connector permanently attached to each of said loops;

each of said snap-type connectors comprising an open-ended hook element (26), a spring-biased latch pin (30) moveable to close or open the hook element, and a ring (33) having a swivel connection to said hook element;

each of said rings (33) extending through one of said loops, whereby each respective snap connector can swivel around the cable while remaining attached to the cable;

a clamp connector means (24) slideably mounted on said cable for adjusting movements therealong;

said clamp connection means comprising a clamp body having a bore (34) slideably encircling the cable so that the clamp body is retained against removal from the cable while being slidable therealong;

said clamp body having an integral tab formed with an opening that defines an eyelet (48) offset from said bore (34), whereby the eyelet is accessible in any adjusted position of said clamp body;

said clamp connection means further comprising a threaded opening (36) intersecting said bore so that the axis of the threaded opening is at right angles to the bore axis;

and a manually operable set screw (38) threaded into said opening, said set screw having one end engageable with the cable to clamp the cable against an internal surface of the bore;

said set screw being manually rotatable so that said one end of the screw is released from the cable, whereby said clamping connection means is than freely slidable on the cable;

said flexible cable being adapted to be wound around a tree, with the hook element (26) on one of said snap type connectors extending through said eyelet (48) and said set screw (38) clamped against the cable, whereby the cable forms a noose of fixed circumferential length freely encircling the tree without tightening on the tree surface, such that a dog restrained by the leash is enabled to move around the three without causing the cable to pull the dog toward the tree.

* * * * *